(12) United States Patent
Funderburk et al.

(10) Patent No.: US 6,377,585 B1
(45) Date of Patent: Apr. 23, 2002

(54) PRECISION REFERENCE GENERATION SYSTEM AND METHOD

(75) Inventors: Richard E. Funderburk, Austin; Christopher C. Ott, Briarcliff, both of TX (US)

(73) Assignee: Datum, Inc., Pflugerville, TX (US)

( * ) Notice: Subject to any disclaimer, the term of this patent is extended or adjusted under 35 U.S.C. 154(b) by 0 days.

(21) Appl. No.: 09/092,452

(22) Filed: Jun. 5, 1998

(51) Int. Cl.⁷ ............................................... H04B 7/216
(52) U.S. Cl. ........................ 370/441; 370/343; 370/479; 370/516; 375/142; 375/355; 375/364; 375/373
(58) Field of Search ................................. 370/343, 335, 370/441, 479, 516; 375/142, 205, 373, 376, 371, 355, 364

(56) References Cited

U.S. PATENT DOCUMENTS

| | | | | |
|---|---|---|---|---|
| 5,748,681 A | * | 5/1998 | Comino | 375/319 |
| 6,014,285 A | * | 1/2000 | Okamura | 360/78.04 |
| 6,078,224 A | * | 6/2000 | Ujie | 331/10 |
| 6,134,260 A | * | 10/2000 | Bottomley | 375/130 |
| 6,148,042 A | * | 11/2000 | Zehavi | 375/340 |

* cited by examiner

*Primary Examiner*—Hassan Kizou
*Assistant Examiner*—Roberto Stevens
(74) *Attorney, Agent, or Firm*—Akin, Gump, Strauss, Hauer & Feld, L.L.P.

(57) ABSTRACT

An apparatus for generating a precision frequency includes a receiver that tracks a CDMA pilot signal and extracts frequency and phase information. This information is then used by a processor to control a precision oscillator. The precision oscillator generates a precise frequency based on the CDMA pilot signal. Time of day information is also extracted by the receiver and processor.

10 Claims, 5 Drawing Sheets

PRECISION REFERENCE GENERATION SYSTEM AND METHOD

BACKGROUND OF THE INVENTION

The invention relates generally to timing and frequency signal generation and, more particularly, to generating precision reference frequencies through the acquisition and tracking of a code division multiple access (CDMA) pilot signal and use of time of day information present on a CDMA synchronization channel within a timing distribution system, such as in a telecommunication end office.

In telecommunication networks, a precise frequency reference is required to allow high speed communications between components of the networks. This reference frequency may be used to provide plesiochronous timing signals for the generation and recovery of digitally coded data, for control of carrier frequencies in wireless operations, or for other purposes.

In order to obtain the required accuracy for this reference frequency, a source traceable to international universal coordinated time (UTC) is generally required. This reference frequency can be from an autonomous source, for example, cesium beam technology, or may be derived from radio frequency transmissions which are controlled to UTC at their source, such as a global positioning system (GPS) satellite navigation arrangement.

Because of the worldwide availability of GPS signals, the high accuracy and reliability of the signals and GPS systems, and the relatively low cost of receiving equipment for such signals, it is presently common to derive precise reference frequencies from GPS signals. However, with the deployment of network communication equipment in many remote locations, reception of GPS signals may be limited by access to suitable antenna locations. The cost and complexity of the required GPS reception antennas, cables, and related equipment limits the possibilities for use of the GPS signals for the derivation. Even more, availability and costs of space for GPS reception antennas is limited and costly. Certain locations may not allow access to suitable unobstructed locations for antennas and equipment of for ready access to such matters.

It would be an improvement in the art and technology to provide a precision reference generation system and method that overcomes the limitations and constraints imposed by antennas, cabling, and equipment issues in conventional reference generation systems that derive reference signals from GPS satellite signals.

SUMMARY OF THE INVENTION

An embodiment of the invention is an apparatus for precision frequency reference generation from CDMA pilot signals having a phase and a frequency. The apparatus includes a receiver for receiving the CDMA pilot signals, a processor connected to the receiver, and an oscillator connected to the processor.

Another embodiment of the invention is an apparatus for precision frequency reference generation. The apparatus includes means for receiving CDMA pilot signals and providing a phase and a frequency of the pilot signal, means for differencing connected to the means for receiving for computing a difference between the phase and a phase of a corrected frequency signal to produce a difference signal, means for processing connected to the means for differencing for processing the frequency to produce a control signal and a timing signal, and means for oscillating connected to the means for processing for generating the corrected frequency signal based upon the control signal.

Yet another embodiment of the invention is a method for generating a precision frequency reference. The method includes steps of receiving CDMA pilot signals and providing a phase and a frequency of the pilot signal, calculating a difference between the phase and a phase of a corrected frequency signal to produce a difference signal, processing the frequency to produce a control signal and a timing signal, and generating the corrected frequency signal based upon the control signal.

DETAILED DESCRIPTION OF THE INVENTION

Figure 1:
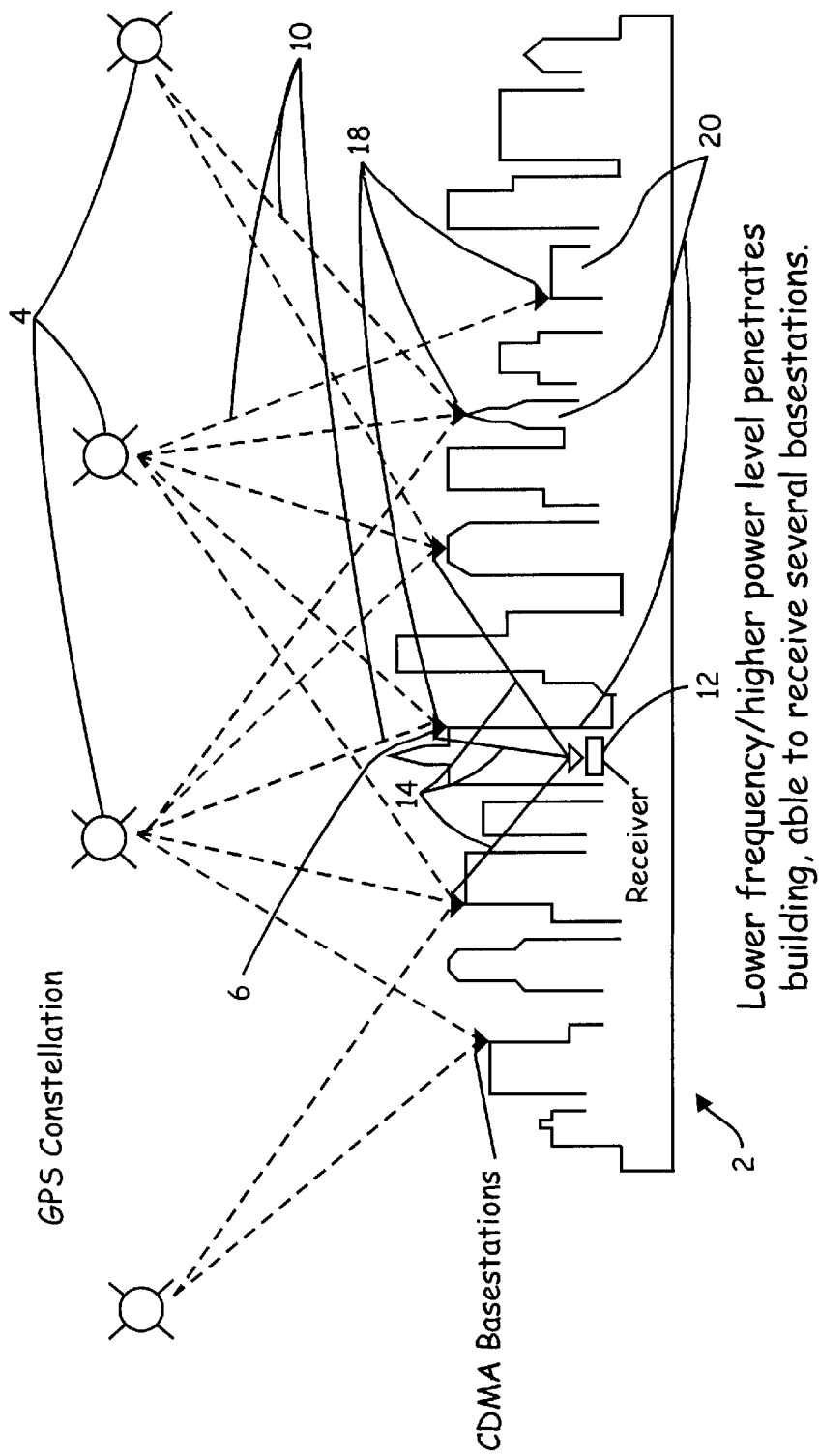
FIG. 1 is an embodiment of a system for deriving a reference frequency according to embodiments of the present invention and, in phantom, a conventional arrangement for derivation of such a reference frequency from GPS satellite signals.

Referring to FIG. 1, a reference frequency generation system 2 includes a GPS satellite 4, a personal communications systems (PCS) base station receiver 6, and a reference frequency generator 12. GPS reception antennas 18 are located in conventional manner atop roofs of buildings 20 and receive GPS satellite signals 10. The base station receiver 6 is, for example, a CDMA base station of a conventional CDMA wireless communications network. The base station receiver 6 receives the signals 10 from the satellite 4 through one or more of the antennas 18 by conventional wireless communications network technology. Timing reference information for the communications network (not shown) including the base station receiver 6 is obtained by the network via the base station receiver 6 from the signals 10 from the satellite 4.

The base station receiver 6 is communicatingly connected by a communications channel 14a to a reference frequency generator 12, for example, by a cable, infrared, or radio frequency, so that signals 14 are received by the generator 12 from the base station receiver 6. The signals 14 are, for example, the conventional communications signals broadcast by a CDMA base station operating as the conventional CDMA wireless communications network and are conventionally broadcast over radio frequency. The generator 12 generates a precise reference frequency from the signals 14 communicated by the receiver 6 to the generator 12 over the communications channel 14a. Details of the generator 12 are described below.

Figure 2:
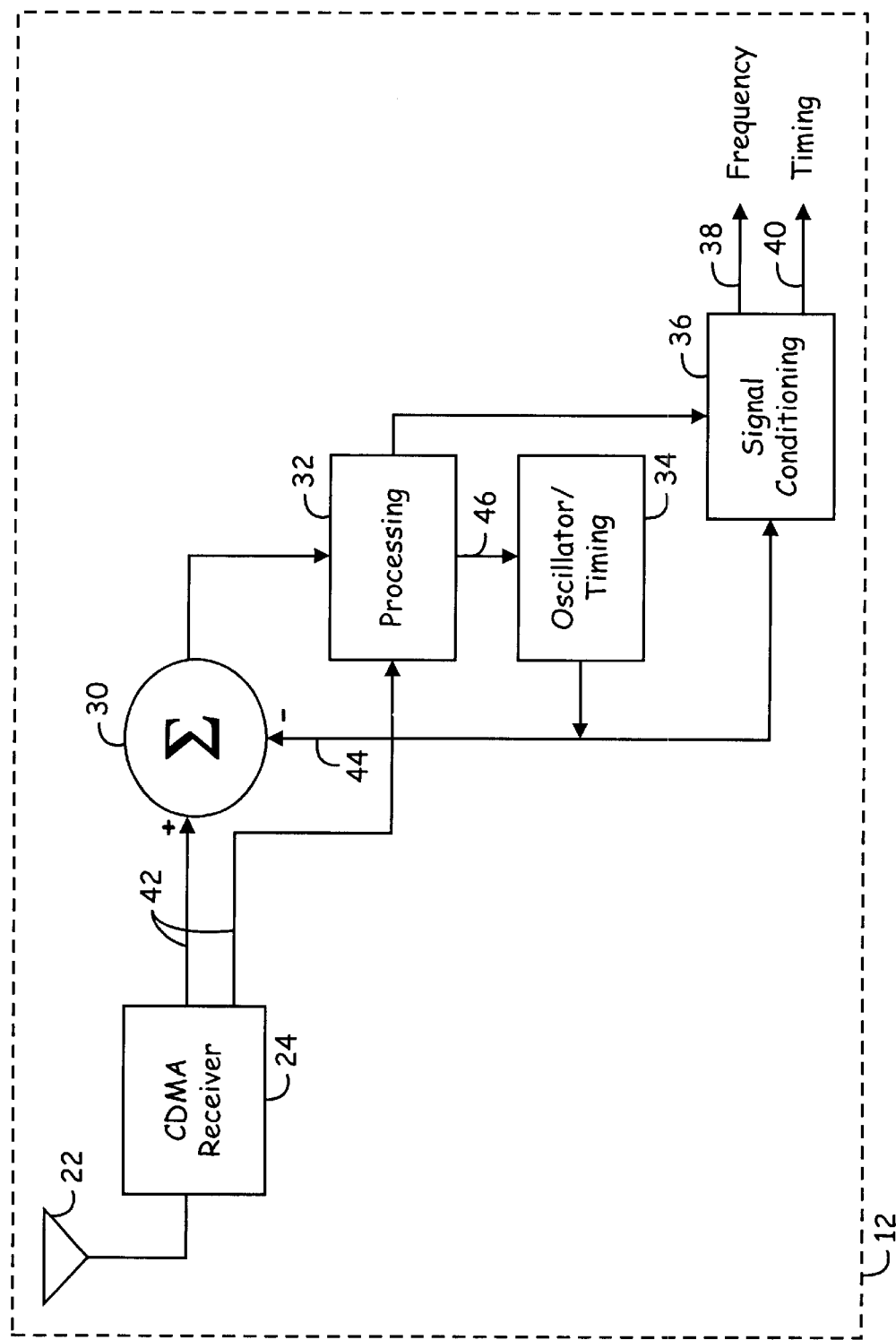
FIG. 2 is a functional block diagram of an embodiment of the system of FIG. 1 for generating a precision reference frequency from a CDMA pilot signal and time of day information.

Referring to FIG. 2, the generator 12, according to embodiments of the present invention, for deriving a reference frequency includes an antenna 22 attached to a receiver 24. As previously stated, the antenna 22 and the receiver 24 of the generator 12 are communicatingly connected to the base station receiver 6 (shown in FIG. 1). The connection between the base station receiver 6 and the generator 12 can be any communications channel capable of accurately communicating to the generator 12 the GPS signals 10 received by the base station receiver 6, for example, electrical or fiber optic cable, coaxial cable, infrared, radio frequency, or others, and is preferably conventional CDMA wireless network radio frequency signals.

The generator 12 includes the antenna 22, the receiver 24, a difference circuit 30, a processor 32, an oscillator 34, and a signal conditioning circuit 36. The difference circuit 30 is connected to the processor 32 and the oscillator 34, and also to the receiver 24. The processor 32 is also connected to the oscillator 34 and the signal conditioning circuit 36, as well as to the receiver 24. The oscillator is also connected to the signal conditioning circuit 36. The outputs of the signal conditioning circuit are a reference frequency signal 38 and a reference timing signal 40. The reference frequency signal 38 and the reference timing signal 40 are precise frequency and timing information, derived from the GPS signals 10 received by the receiver 24 from the base station receiver 6 (shown in FIG. 1) and generated by the generator 12.

In operation, the antenna 22 receives the signals 14 (shown in FIG. 1), such signals 14 being representative of the GPS signals 10 (also shown in FIG. 1), and provides the signals 14 to the receiver 24. The receiver 24 delivers receiver signals 42 representative of the frequency and timing information of the GPS signals 10 to the difference circuit 30 and the processor 32. Preferably, any cable (not shown) connecting the antenna 22 to the receiver 24 is short or the antenna 22 is connected directly to the receiver 24. The receiver 24 searches the various CDMA pilot channels for signals, and selects a pilot channel with high power level. The receiver 24 then tracks that pilot channel and provides as the receiver signals 42 to the generator 12 the particular phase and frequency results of that signal from the tracking loop of the receiver 24. Those phase and frequency results are passed to the difference circuit 30. In addition, the receiver 24 outputs to the processor 32 a decoded time of day (TOD) signal from a sync channel of the receiver 24.

The difference circuit 30 sums the receiver signals 42 with a corrected frequency signal 44 generated by the oscillator 34. The difference circuit 30 computes the difference in phase between a phase of the pilot channel and the corrected frequency signal 44 from the oscillator 34. The difference circuit 30 is hardware logic that performs the summing calculation by tracking a pulse from the receiver 24 that is phase-locked to the receiver signals 42, or, alternatively, the results of the tracking loop of the receiver 24 are made available to the difference circuit 30 directly through software operating with a processor. The result of the summing by the difference circuit 30 is input to the processor 32.

The processor 32 operates on the respective inputs from the difference circuit 30 and the receiver 24. Particularly, the processor 32 reformats and passes output of the processor 32 to the signal conditioning circuit 36. The results of the operations of the processor 32 are output to the oscillator 34 and the signal conditioning circuit 36. That output includes an on-time pulse synchronized to the second, for use by the signal conditioning circuit 36. The oscillator 34 is controlled as dictated by the output from the processor 32. The signal conditioning circuit 36 refines that output, based on the output corrected reference frequency of the oscillator 34, to produce precise signals, i.e., the reference frequency signal 38 and the reference timing signal 40, which can serve as a frequency and timing reference for precision timing in other systems (not shown).

Figure 3:
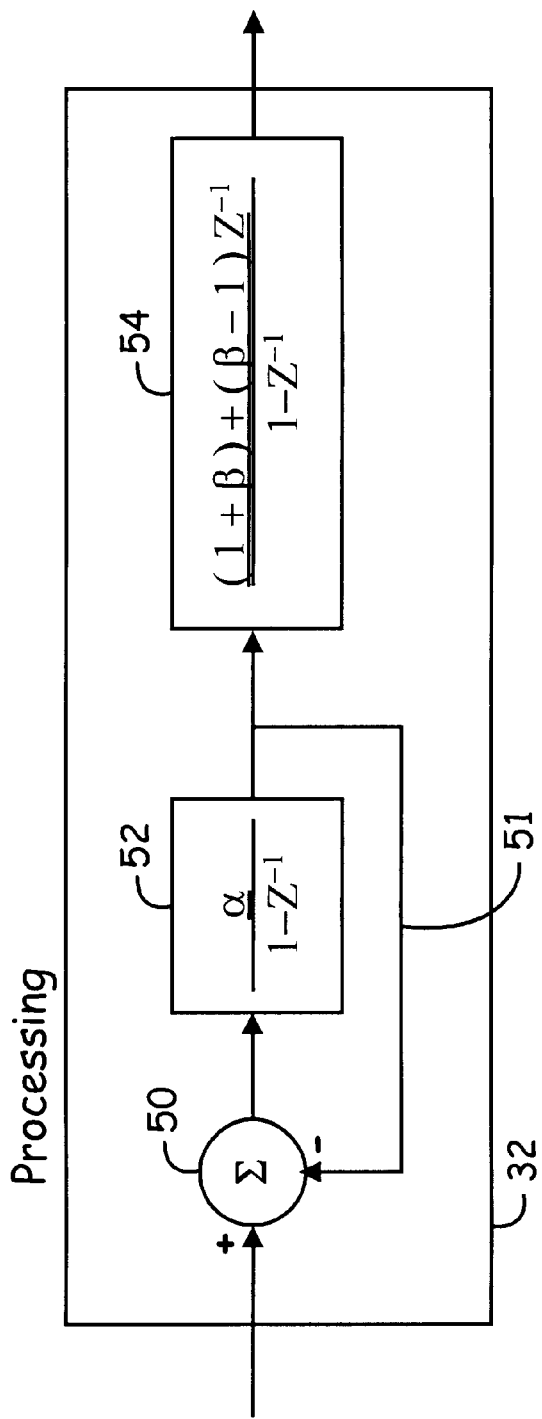
FIG. 3 is a detailed block diagram of the processing block of the system of FIG. 2.

Referring to FIG. 3, the processor 32 includes several functional elements, including a processor difference circuit 50, a first filter 52, and a second filter 54. The processor difference circuit 50 is connected to the difference circuit 30 (shown in FIG. 2). The first filter 52 is connected to the processor difference circuit 50 to receive output signals from the processor difference circuit 50. Outputs of the first filter 52 are returned to the processor difference circuit 50 via a feed-back loop signal 51 and are input to the second filter 54. Outputs of the second filter are delivered to the oscillator 34 (shown in FIG. 2) and the signal conditioning circuit 36 (also shown in FIG. 2).

In operation of the processor 32, the processor difference circuit 50 receives input signals from the difference circuit 30 (shown in FIG. 1) and sums the signals with the feed-back loop signal 51. The processor difference circuit 50 is conventional. The circuit 50 calculates a difference between the input to the processor 32 from the receiver 24 (shown in FIG. 2) and the feed-back loop signal 51. Output of the processor difference circuit 50 is input to the first filter 52.

The first filter 52 serves to apply a filter constant to the output of the processor difference circuit 50. The first filter 52 is, for example, a digital, low-pass filter of a bandwidth that does not adversely impact the second filter. The first filter 52 has a time constant of $\alpha$ and a digital delay of $1-Z^{-1}$ (i.e., standard Z transform). The first filter 52 serves to remove noise from the signal received from the processor difference circuit 50.

Output of the first filter 52 is input to the second filter 54. The second filter 54 is, for example, a digital, lead-lag filter. A time constant of the second filter 54 is $\beta$ and a digital delay is $1-Z^{-1}$ (i.e., standard Z transform). The time constant of the second filter 54 is dynamic in order to accommodate fast acquisition and also to allow for long averaging once the input to the second filter is being tracked. Output of the second filter 54 is an actual frequency offset, for input to the oscillator 34 as signal 46. The signal 46 is also input to the signal conditioning circuit 36.

At the oscillator 34, control is dictated by the particular signal 46 received. The oscillator 34 is controlled by the signal 46 to generate the corrected frequency signal 44. The corrected frequency signal 44 is traceable back to the GPS-dictated timing and frequency via the generator 12, the receiver 24 and the base station receiver 6. The control to obtain the corrected frequency signal 44 is achieved by a variety of schemes. For example, direct manipulation may be achieved of a high stability oscillator (i.e., the oscillator 34) through an electrical tuning input to such oscillator. The scheme provides good phase noise characteristics, but optimal performance can be difficult to obtain because of variances in oscillators. Long term aging of the crystal of such an oscillator may affect tuning range and required field service to mechanically tune the oscillator. Another scheme is direct digital frequency synthesis (DDS). In DDS, acceptable phase noise characteristics can be obtained, with advantages of repeatable performance characteristics of oscillators. DDS can cover a range to adapt to crystal aging that may occur in oscillators. Alternatively, full analog frequency synthesis can be employed.

Control of the oscillator 34 by the signal 46 to provide the corrected frequency signal 44 for feed back to the difference circuit 30 forms a phase-locked loop (PLL). This PLL has a time constant of $\beta$ at the second filter 54. The PLL serves to lock the generator 12 in order to provide the reference frequency signal 38 and the reference timing signal 40.

Figure 4:
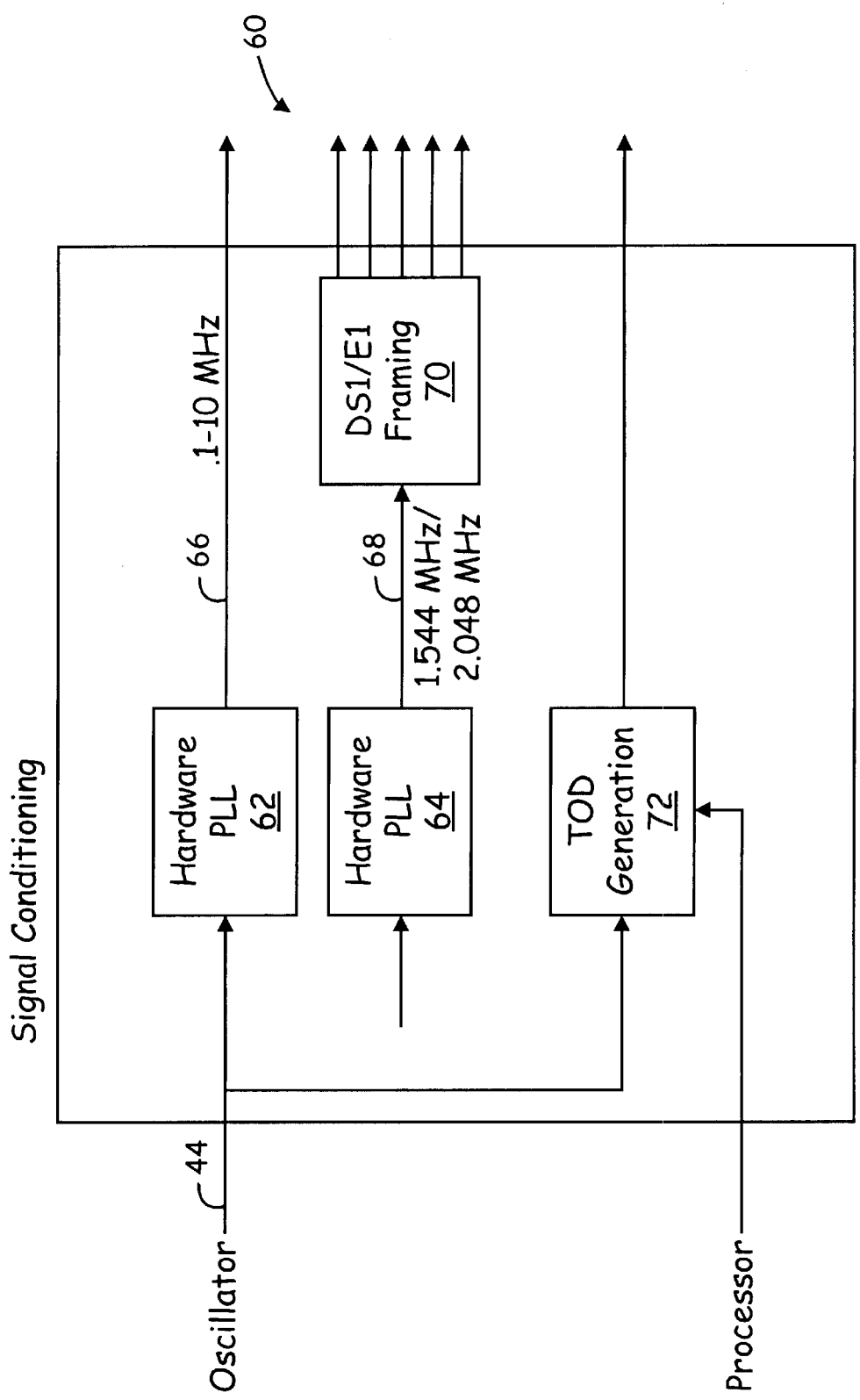
FIG. 4 is a detailed block diagram of the signal conditioning block of the system of FIG. 2.

Referring to FIG. 4, the signal conditioning circuit 36 receives inputs of the output of the processor 32 and the corrected frequency signal 44 from the oscillator 34. The signal conditioning circuit includes a first hardware phase-locked loop (PLL) 62 and a second hardware phase locked loop (PLL) 64. The first hardware PLL 62 and the second hardware PLL 64 are each locked, in conventional manner, to the corrected frequency signal 44 output from the oscillator 34.

The outputs 66 and 68 of the first hardware PLL 62 and the second hardware PLL 64, respectively, are signals of various frequency. The frequency varies according to the desired results of the reference frequency signal 38 and the reference timing signal from the generator 12, as those skilled in the art will know and understand. For example, the output 66 of the first hardware PLL 62 can have broad frequency range possibilities, for example, from about 100 KHz to about 10 MHz. Of course, the driver requirements to provide the desired output 66 in any instance are not shown in FIG. 4, as those requirements are known and understood by those skilled in the art. Also for example, the output 68 of the second hardware PLL 64 can provide timing for DS1/E1 framed outputs or other outputs. An exemplary framing circuit 70, such as is conventional, provides the desired framed outputs. In such case, the framing circuit 70 provides Alternate Mark Inversion (AMI) signals and appropriate framing bits desired in any particular application. Of course, numerous alternative frequency conditions for the reference frequency signal 38 are possible as desired, and may, for example, include G.703/10 clocking, composite clocks, and different frequency references.

In addition, the signal conditioning circuit 36 containing a time of day (TOD) generator 72 which receives inputs of the corrected frequency signal 44 and signals output by the processor 32. The TOD generator 72 can be, for example, by EIA-232 signal, full IRIG-B carrier, or network time protocol (NTP) available over the Internet or Intranet. Based on the inputs, the TOD generator 72 uses the corrected frequency signal 44 as a frequency reference and signal from the processor 32 as a time of day reference and formats a stable timing signal that is output as the reference timing signal 40. It is of note that, if the output of the processor 32 is not available to the signal conditioning circuit 36, the corrected frequency signal 44 itself provides timing information as the reference timing signal 40.

Figure 5:
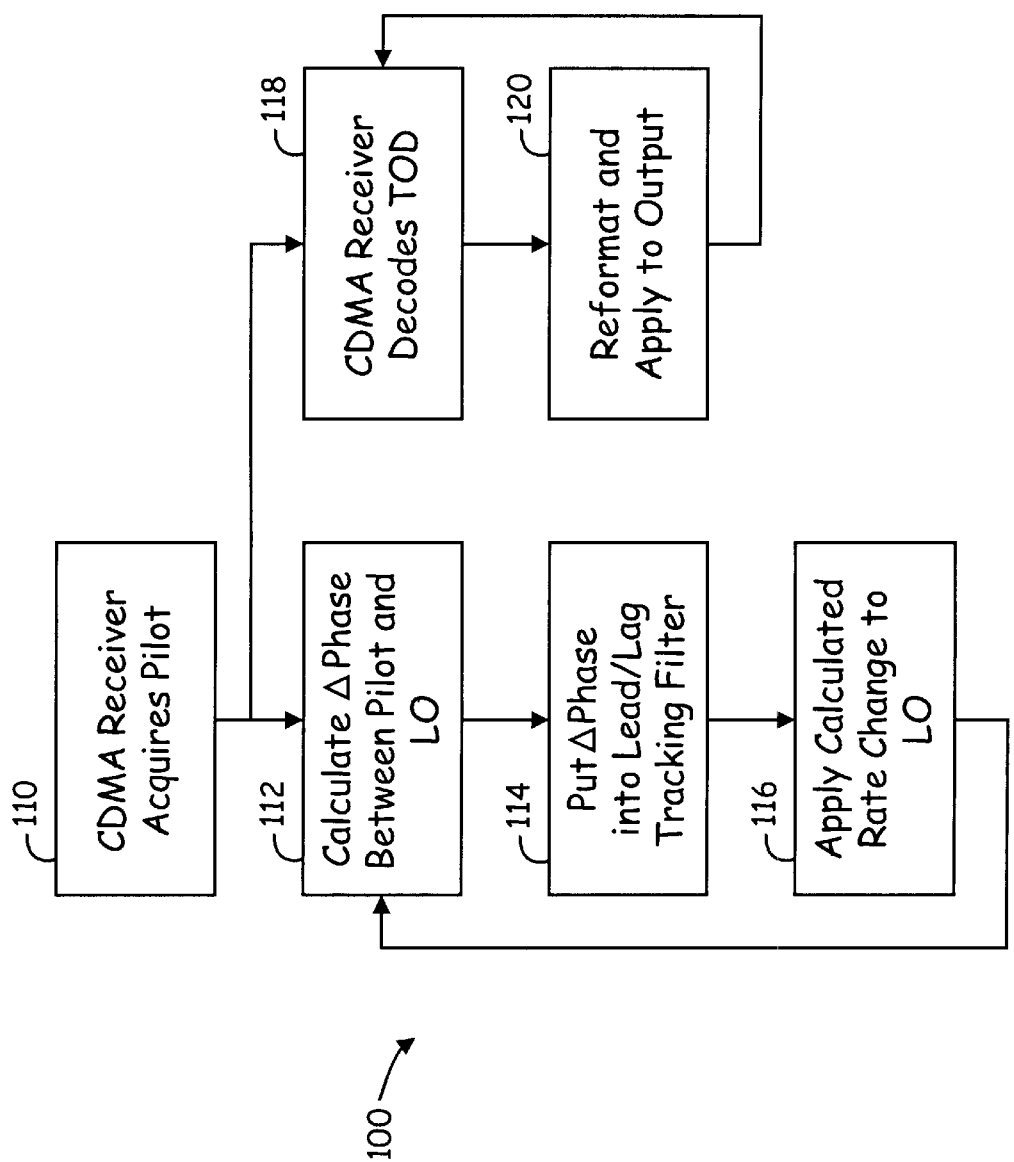
FIG. 5 is a flow diagram of an embodiment of a method for generating a precision reference frequency from a CDMA pilot signal and time of day information.

Referring to FIG. 5, a method 100 generates precision frequency reference signals. In a step 110 of the method 100, the receiver 24 acquires and locks on the pilot signal from the GPS satellite 4 provided through the base station receiver 6. Once the receiver 24 acquires the pilot signal, a phase difference is calculated in a step 112, between the phase of the pilot signal and the phase of a local oscillator (i.e., the oscillator 34). In a step 114, the phase difference is filtered in a lead/lag tracking filter (i.e., the second filter 54 of the processor 32). The filtered result is then applied to change the local oscillator signal in a step 116. Thereafter, the method 100 returns to the step 112.

Simultaneously with the steps 112, 114, and 116 of the method 100, the receiver 6 decodes the time of day (TOD) from the pilot signal sync channel in a step 118. In a step 120, the TOD information from the pilot signal is reformatted and output. The method 100 then returns to the step 118.

It is to be understood that multiple variations, changes and modifications are possible in the aforementioned embodiments of the invention. Although illustrative embodiments of the invention have been shown and described, a wide variety of modification, change and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. An apparatus for precision frequency reference generation, comprising:

means for receiving CDMA pilot signals and providing a phase and a frequency of the pilot signal;

means for differencing connected to the means for receiving for computing a difference between the phase and a phase of a corrected frequency signal to produce a difference signal;

means for processing connected to the means for differencing for processing the frequency to produce a control signal and a timing signal;

means for oscillating connected to the means for processing for generating the corrected frequency signal based upon the control signal.

2. The apparatus of claim 1, wherein the means for processing comprises:

a low-pass filter for filtering the difference signal and the frequency to produce a filter signal; and a lead-lag filter connected to the low-pass filter for filtering the filter signal to generate the control signal.

3. The apparatus of claim 1, wherein the means for oscillating generates the corrected frequency signal by direct manipulation of a high stability oscillator through an electrical tuning input.

4. The apparatus of claim 1, wherein the means for oscillating generates the corrected frequency signal by direct digital frequency synthesis.

5. The apparatus of claim 1, wherein the means for oscillating generates the corrected frequency signal by full analog frequency synthesis.

6. A method for generating a precision frequency reference, comprising the steps of:

receiving CDMA pilot signals and providing a phase and a frequency of the pilot signal;

calculating a difference between the phase and a phase of a corrected frequency signal to produce a difference signal;

processing the frequency to produce a control signal and a timing signal; and generating the corrected frequency signal based upon the control signal.

7. The method of claim 6, further comprising the steps of:

processing the phase and the frequency of the CDMA pilot signals with the corrected frequency signal to produce the control signal and the timing signal; and generating the corrected frequency signal by comparing the timing signal to a signal generated by an oscillator.

8. The method of claim 7, wherein the oscillator generates the corrected frequency signal by direct manipulation of a high stability oscillator through an electrical tuning input.

9. The method of claim 7, wherein the oscillator generates the corrected frequency signal by direct digital frequency synthesis.

10. The method of claim 7, wherein the oscillator generates the corrected frequency signal by full analog frequency synthesis.

* * * * *